United States Patent
Park et al.

(10) Patent No.: US 11,635,860 B2
(45) Date of Patent: Apr. 25, 2023

(54) TOUCH SENSOR PANEL

(71) Applicant: DONGWOO FINE-CHEM CO., LTD., Iksan-si (KR)

(72) Inventors: Ki Joon Park, Yongin-si (KR); Sung Jin Noh, Hwaseong-si (KR)

(73) Assignee: DONGWOO FINE-CHEM CO., LTD., Ikan-si (KR)

(*) Notice: Subject to any disclaimer, the term of this patent is extended or adjusted under 35 U.S.C. 154(b) by 1 day.

(21) Appl. No.: 17/121,921

(22) Filed: Dec. 15, 2020

(65) Prior Publication Data

US 2021/0208729 A1 Jul. 8, 2021

(30) Foreign Application Priority Data

Jan. 2, 2020 (KR) .................. 10-2020-0000354

(51) Int. Cl.
G06F 3/044 (2006.01)
C09J 7/38 (2018.01)

(52) U.S. Cl.
CPC ............ *G06F 3/0443* (2019.05); *C09J 7/385* (2018.01)

(58) Field of Classification Search
CPC .......... G06F 3/041; G06F 2203/04102; G06F 2203/04103; G06F 3/0446; G06F 3/0443; G06F 3/0412
See application file for complete search history.

(56) References Cited

U.S. PATENT DOCUMENTS

| | | | | |
|---|---|---|---|---|
| 2012/0064325 | A1* | 3/2012 | Fumoto | C09J 7/29 428/354 |
| 2015/0346408 | A1* | 12/2015 | Mizutani | C08F 220/1804 428/41.5 |
| 2016/0253035 | A1* | 9/2016 | Mitamura | G06F 3/0446 345/174 |
| 2018/0046288 | A1* | 2/2018 | Tsukamoto | G06F 3/047 |
| 2018/0157125 | A1* | 6/2018 | Yasui | G02B 1/16 |
| 2018/0157350 | A1* | 6/2018 | Song | H01L 27/323 |
| 2019/0205603 | A1* | 7/2019 | Lee | H01L 51/5284 |
| 2020/0192431 | A1* | 6/2020 | Shin | G06F 1/1656 |
| 2021/0405781 | A1* | 12/2021 | Li | H01L 27/323 |

FOREIGN PATENT DOCUMENTS

KR   10-2011-0039182 A   4/2011

* cited by examiner

*Primary Examiner* — Md Saiful A Siddiqui
(74) *Attorney, Agent, or Firm* — Sughrue Mion, PLLC

(57) ABSTRACT

A touch sensor panel includes a base layer, a first adhesive layer having one side bonded to one side of the base layer and composed of a pressure-sensitive adhesive (PSA), an electrode layer having one side bonded to the other side of the first adhesive layer, a second adhesive layer having one side bonded to the other side of the electrode layer and composed of a pressure-sensitive adhesive (PSA), and a functional layer having one side bonded to the other side of the second adhesive layer.

1 Claim, 2 Drawing Sheets

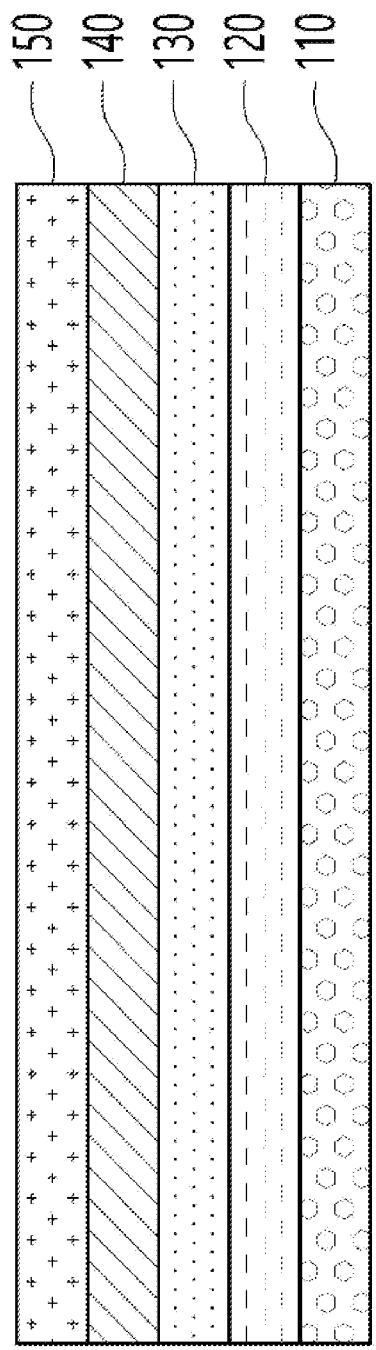
[Figure 1] Prior Art

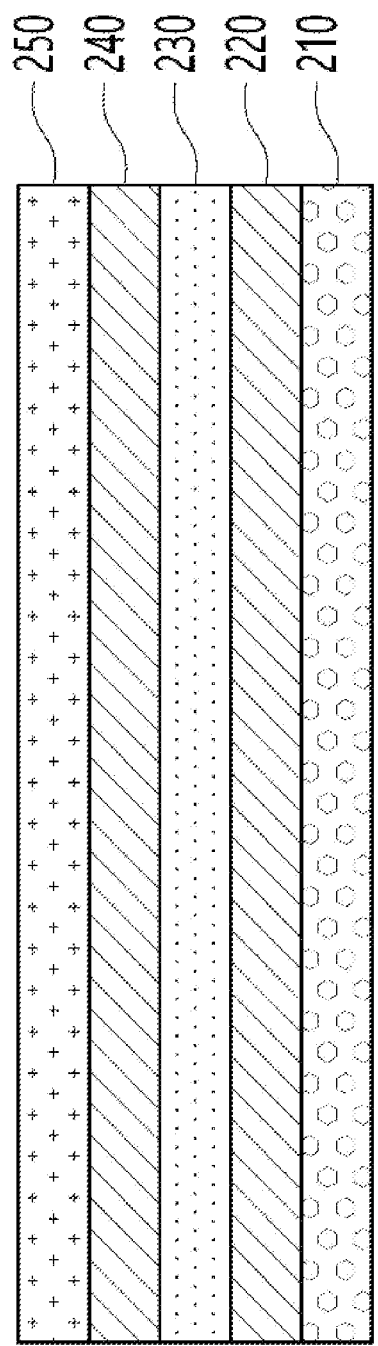
[Figure 2]

TOUCH SENSOR PANEL

CROSS REFERENCE TO RELATED APPLICATIONS

This application claims priority based on Korean Patent Application No. 10-2020-0000354, filed Jan. 2, 2020, the content of which is incorporated herein by reference in its entirety.

TECHNICAL FIELD

The present invention relates to a touch sensor panel. Specifically, the present invention relates to a touch sensor panel capable of blocking or suppressing the occurrence of cracks in an electrode layer.

BACKGROUND ART

The display device is a device that displays information to the outside. The display device includes a liquid crystal display device, a plasma display panel device, an electroluminescent display device, an organic light-emitting diode display device, etc. The display device includes a touch sensor panel as a device for inputting commands by touching instructions displayed on a screen with a finger or a pen.

The touch sensor panel includes a resistive type, a capacitive type, an ultrasonic type, an infrared type, and so on, according to the sensing method of a touch part. Recently, the capacitive type is mainly used. The capacitive type uses a transparent substrate on which a conductive thin film is formed. When a user touches a surface of a coated transparent substrate with a certain amount of current flowing through the surface of the transparent substrate, the amount of current changes at the contact surface. The capacitive type detects such a change in current to detect whether or not it is touched.

FIG. 1 is a cross-sectional view of a conventional touch sensor panel.

As shown in FIG. 1, the conventional touch sensor panel uses a COP (cyclo-olefin polymer) layer 110 as a base layer, and a UV adhesive layer 120, an electrode layer 130, and a PSA (pressure sensitive adhesive) layer 140 are formed thereon. In the conventional touch sensor panel, a polarization layer 150 as a functional layer is stacked on the PSA layer 140.

As described above, the conventional touch sensor panel uses a UV adhesive to bond the COP layer 110 as the base layer and the electrode layer 130 as the sensing layer. The UV adhesive has a modulus (tensile modulus of elasticity) of 2.5 or more due to material properties, and it is difficult to implement a thickness of 5 μm or more.

However, in order to block or suppress the occurrence of cracks in the electrode layer by increasing the dynamic folding capability of the touch sensor panel, it is advantageous to increase the modulus capability (i.e., lower the modulus value) and maintain the thickness at a certain size or more. However, since the conventional touch sensor panel uses a UV adhesive for bonding the COP layer 110 and the electrode layer 130, it is difficult to block or suppress the occurrence of cracks in the electrode layer during the dynamic folding of the touch sensor panel.

DISCLOSURE OF INVENTION

Technical Problem

The present invention has been made on the basis of the technical background as described above, and has an object of providing a touch sensor panel capable of blocking or minimizing the occurrence of cracks in the electrode layer by increasing the dynamic folding capability of the touch sensor panel.

In addition, the present invention is to provide an optimum thickness of a pressure-sensitive adhesive layer that can minimize thickening of the touch sensor panel while maximizing the dynamic folding capability of the touch sensor panel.

Technical Solution

The touch sensor panel of the present invention for achieving such objects may comprise a base layer, a first adhesive layer, an electrode layer, a second adhesive layer, a functional layer, and so on.

One side of the first adhesive layer may be bonded to one side of the base layer. The first adhesive layer may be composed of a pressure-sensitive adhesive (PSA).

One side of the electrode layer may be bonded to the other side of the first adhesive layer.

One side of the second adhesive layer may be bonded to the other side of the electrode layer. The second adhesive layer may be composed of a pressure-sensitive adhesive.

One side of the functional layer may be bonded to the other side of the second adhesive layer.

In the touch sensor panel of the present invention, the first and the second adhesive layers may have a modulus of 0.2 to 2. The first and the second adhesive layers may have a thickness of 10 to 30 μm.

In the touch sensor panel of the present invention, the base layer may be a COP layer.

In the touch sensor panel of the present invention, the functional layer may be a polarization layer.

Advantageous Effects

In the touch sensor panel of the present invention having such a configuration, pressure-sensitive adhesive (PSA) layers are used for both of the bonding of the base layer and the electrode layer and the bonding of the electrode layer and the functional layer. Through this, the present invention can lower the modulus to 2.5 or less and make the thickness to 5 μm or more. As a result, the present invention can increase the dynamic folding capability of the touch sensor panel. In addition, the present invention can block or minimize the occurrence of cracks in the electrode layer.

In addition, the touch sensor panel of the present invention may optimize the thickness of the first and second pressure-sensitive adhesive layers to 10 to 30 μm. Through this, the present invention can maximize the dynamic folding capability of the touch sensor panel. The present invention can minimize thickening of the touch sensor panel.

DESCRIPTION OF DRAWINGS

FIG. 1 is a cross-sectional view of a conventional touch sensor panel.

FIG. 2 is a cross-sectional view of a touch sensor panel according to the present invention.

BEST MODE

Hereinafter, the present invention will be described in detail with reference to the drawings.

FIG. 2 is a cross-sectional view of a touch sensor panel according to the present invention.

As shown in FIG. 2, the touch sensor panel of the present invention may include a base layer 210, a first adhesive layer 220, an electrode layer 230, a second adhesive layer 240, a functional layer 250, and so on.

The base layer 210 is a base supporting the electrode layer 230 or the like. The base layer 210 may be composed of, for example, a cyclo-olefin polymer (COP), polycarbonate, polyethylene terephthalate (PET), polymethyl methacrylate, polyimide, polyethylene naphthalate, polyether sulfone, etc.

The base layer 210 may have a thickness of 75 to 200 μm, preferably 100 to 150 μm. If the thickness of the base layer 210 is less than 75 μm, the tension when transferring the touch sensor is too high, so cracks may occur in the touch sensor. If the thickness of the base layer 210 exceeds 200 μm, the elastic modulus of the base layer 210 is too high, so it may be difficult to control peeling.

The base layer 210 may be a separation layer when the touch sensor panel is manufactured by a transfer method. As the separation layer, an organic polymer film may be used. For example, at least one selected from the group consisting of polyimide, poly vinyl alcohol, polyamic acid, polyamide, polyethylene, polystyrene, polynorbornene phenylmaleimide copolymer, polyazobenzene, polyphenylenephthalamide, polyester, polymethyl methacrylate, polyarylate, cinnamate polymer, coumarin polymer, phthalimidine polymer, chalcone polymer and aromatic acetylene polymer may be used.

The base layer 210 may further have one or more protective layers on the separation layer. The protective layer protects the electrode layer 230 against external contact or impact, and may reinforce the function of the separation layer. The protective layer may include at least one of an organic insulation layer or an inorganic insulation layer. The protective layer can be formed through coating/curing or deposition.

The first adhesive layer 220 may be bonded between the base layer 210 and the electrode layer 230, that is, one side may be bonded to one side of the base layer 210 and the other side may be bonded to one side of the electrode layer 230. The first adhesive layer 220 may bond the base layer 210 and the electrode layer 230. The first adhesive layer 220 may be composed of a pressure-sensitive adhesive (PSA).

The pressure-sensitive adhesive may include an acrylic copolymer and a crosslinking agent.

The acrylic copolymer may be a copolymer of a (meth) acrylate monomer having an alkyl group having 1-12 carbon atoms and a polymerizable monomer having a crosslinkable functional group.

In the present invention, (meth)acrylate means acrylate and methacrylate. Examples of the (meth)acrylate monomer having an alkyl group having 1-12 carbon atoms include n-butyl (meth)acrylate, 2-butyl (meth)acrylate, t-butyl (meth)acrylate, 2-ethylhexyl (meth)acrylate, ethyl (meth) acrylate, methyl (meth)acrylate, n-propyl (meth)acrylate, isopropyl (meth)acrylate, pentyl (meth)acrylate, n-octyl (meth)acrylate, isooctyl (meth)acrylate, nonyl (meth)acrylate, decyl (meth)acrylate, lauryl (meth)acrylate, and the like. These may be used alone or in combination of two or more.

The polymerizable monomer having a crosslinkable functional group is a component that can impart durability and cuttability by reinforcing the cohesive strength or adhesive strength of the adhesive composition by chemical bonding, examples of which include a monomer having a hydroxy group and a monomer having an carboxyl group, and these can be used alone or in combination of two or more.

Examples of the monomer having a hydroxy group include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethylene glycol (meth)acrylate, 2-hydroxypropylene glycol (meth)acrylate, hydroxyalkylene glycol (meth)acrylate having 2 to 4 carbon atoms in the alkylene group, 4-hydroxybutyl vinyl ether, 5-hydroxypentyl vinyl ether, 6-hydroxyhexyl vinyl ether, 7-hydroxyheptyl vinyl ether, 8-hydroxyoctyl vinyl ether, 9-hydroxynonyl vinyl ether, 10-hydroxydecyl vinyl ether, and the like.

Examples of the monomer having a carboxyl group include monoacids such as (meth)acrylic acid and crotonic acid; diacids such as maleic acid, itaconic acid, and fumaric acid, and monoalkyl esters thereof; 3-(meth)acryloylpropionic acid; succinic anhydride ring-opening adduct of 2-hydroxyalkyl (meth)acrylate having 2 to 3 carbon atoms in the alkyl group, succinic anhydride ring-opening adduct of hydroxyalkylene glycol (meth)acrylate having 2 to 4 carbon atoms in the alkylene group, and compounds obtained by ring-opening addition of succinic anhydride to the caprolactone adduct of 2-hydroxyalkyl (meth)acrylate having 2 to 3 carbon atoms in the alkyl group.

The acrylic copolymer may further contain other polymerizable monomers in addition to the above monomers in a range that does not decrease the adhesive strength, for example, 10 weight % or less based on the total amount.

The method for producing the copolymer is not particularly limited. It can be prepared using a method commonly used in the art such as bulk polymerization, solution polymerization, emulsion polymerization or suspension polymerization, and solution polymerization is preferred. In addition, solvents, polymerization initiators, chain transfer agents for molecular weight control, etc., which are usually used in polymerization, can be used.

The acrylic copolymer preferably has a weight average molecular weight (in terms of polystyrene, Mw) of 50,000 to 2,000,000 measured by gel permeation chromatography (GPC), and more preferably 400,000 to 2,000,000. When the weight average molecular weight is less than 50,000, cohesion between copolymers is insufficient, which may cause adhesion durability problems. When it exceeds 2,000,000, a large amount of diluting solvent may be required to ensure processability during coating.

The crosslinking agent is a component capable of improving adhesion and durability, and maintaining reliability and shape of an adhesive at high temperatures. An isocyanate-based, epoxy-based, peroxide-based, metal chelate-based, oxazoline-based, or the like may be used as the crosslinking agent, and these can be used alone or in combination of two or more. Among these, isocyanate-based is preferable. Specifically, diisocyanate compounds such as tolylene diisocyanate, xylene diisocyanate, hexamethylene diisocyanate, and 2,4- or 4,4-diphenylmethane diisocyanate; and adducts of polyhydric alcohol-based compounds such as trimethylolpropane of diisocyanate, etc. may be used.

In addition to the isocyanate crosslinking agent, at least one crosslinking agent selected from the group consisting of melamine derivatives such as hexamethylolmelamine, hexamethoxymethylmelamine, hexabutoxymethylmelamine, and the like; polyepoxy compounds such as bisphenol A and epichlorohydrin condensed epoxy compounds; and polyglycidyl ether of polyoxyalkylene polyol, glycerin di- or triglycidyl ether, and tetraglycidyl xylenediamine may be added and used together.

The electrode layer 230 senses a touch input. One side of the electrode layer 230 may be bonded to the other side of the first adhesive layer 220. The electrode layer 230 may be formed of a transparent conductive layer, for example, a metal, a metal nanowire, a metal oxide, a carbon nanotube, graphene, a conductive polymer, a conductive ink, or the like. As the metal, gold (Au), silver (Ag), copper (Cu), molybdenum (Mo), aluminum (Al), palladium (Pd), neodymium (Nd), silver-palladium-copper alloy (APC) or the like may be used. As the metal oxide, indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO—Ag—ITO), indium zinc oxide-silver-indium zinc oxide (IZO—Ag—IZO), indium zinc tin oxide-silver-indium zinc tin oxide (IZTO—Ag—IZTO), aluminum zinc oxide-silver-aluminum zinc oxide (AZO—Ag-AZO), etc. may be used.

It is preferable that the electrode layer 230 has an electrode pattern structure used in a capacitive type. The electrode layer 230 may employ a mutual-capacitance type or a self-capacitance type.

In the case of a mutual-capacitance type, a grid electrode structure with a horizontal axis and a vertical axis may be used. The grid electrode structure may include a bridge electrode at an intersection of the horizontal and vertical electrodes. The grid electrode structure may have a shape in which a horizontal axis electrode pattern layer and a vertical axis electrode pattern layer are respectively formed to be electrically spaced apart.

In the case of the self-capacitance type, it may have an electrode layer structure in which a change in capacitance is read by using one electrode at each point.

The second adhesive layer 240 may be bonded between the electrode layer 230 and the functional layer 250, that is, one side is bonded to the other side of the electrode layer 230 and the other side is bonded to one side of the functional layer 250. The second adhesive layer 240 may bond the electrode layer 230 and the functional layer 250. The second adhesive layer 240 may be composed of a pressure-sensitive adhesive (PSA).

The pressure-sensitive adhesive of the second adhesive layer 240 may be formed of the same material as the pressure-sensitive adhesive of the first adhesive layer 220. The description of the pressure-sensitive adhesive is replaced with a related description of the first adhesive layer 220.

One side of the functional layer 250 may be bonded to the other side of the second adhesive layer 240. The functional layer 250 may be a transparent film, a polarizing plate, or the like.

The transparent film may be an isotropic film, a retardation film, a protective film, or the like. The transparent film may contain one or more additives. Examples of the additive may include an UV absorber, an antioxidant, a lubricant, a plasticizer, a releasing agent, a coloring-preventing agent, an anti-flame agent, an anti-static agent, a pigment and a colorant. The transparent film may comprise various functional layers including a hard coating layer, an anti-reflective layer, and a gas barrier layer on one surface or both surfaces thereof.

The transparent film may be surface-treated. For example, the surface treatment may be carried out by drying method such as plasma, corona, and primer treatment, or by chemical method such as alkali treatment including saponification.

The polarizing plate may be any one known to be used in a display panel. As the polarizing plate, for example, those in which a protective layer is formed on at least one surface of a polarizer dyed with iodine or a dichroic dye after stretching a polyvinyl alcohol film, a liquid crystal aligned to have the performance of a polarizer, a transparent film coated with an oriented resin such as polyvinyl alcohol, and then stretched and dyed, or the like may be used.

Tables 1 to 5 below show the measurement of bending stress and crack occurrence of the electrode layer for various radii of curvature after forming the base layer 210 as a COP layer and configuring the functional layer 250 as a polarizing layer, varying the thickness and modulus of the first and second adhesive layers 220 and 240. Here, the crack occurrence is indicated as 'o' when cracks occur in the electrode layer 230, and 'x' when cracks do not occur.

TABLE 1

| | Thickness (μm) | | | | | | | | | |
| | 5 | | | | | | | | | |
| | Modulus | | | | | | | | | |
| Radius of | 0.1 | | 0.2 | | 1 | | 2 | | 2.2 | |
| curvature (R) | Bending stress | Crack occurrence | Bending stress | Crack occurrence | Bending stress | Crack occurrence | Bending stress | Crack occurrence | Bending stress | Crack occurrence |
|---|---|---|---|---|---|---|---|---|---|---|
| 1 | 0.84 | o | 0.98 | o | 1.28 | o | 1.32 | o | 1.53 | o |
| 2 | 0.82 | o | 0.81 | o | 1.14 | o | 1.25 | o | 1.33 | o |
| 3 | 0.76 | o | 0.80 | o | 1.01 | o | 1.06 | o | 1.16 | o |
| 4 | 0.72 | o | 0.72 | o | 0.87 | o | 0.94 | o | 0.98 | o |
| 5 | 0.68 | o | 0.54 | o | 0.81 | o | 0.89 | o | 0.91 | o |
| 6 | 0.57 | o | 0.48 | o | 0.58 | o | 0.67 | o | 0.85 | o |
| 7 | 0.48 | o | 0.35 | o | 0.55 | o | 0.53 | o | 0.72 | o |

TABLE 2

| | Thickness (μm) 10 Modulus | | | | | | | | | |
|---|---|---|---|---|---|---|---|---|---|---|
| Radius of | 0.1 | | 0.2 | | 1 | | 2 | | 2.2 | |
| curvature (R) | Bending stress | Crack occurrence | Bending stress | Crack occurrence | Bending stress | Crack occurrence | Bending stress | Crack occurrence | Bending stress | Crack occurrence |
| 1 | 0.58 | ○ | 0.59 | ○ | 0.64 | ○ | 0.67 | ○ | 0.94 | ○ |
| 2 | 0.51 | ○ | 0.51 | ○ | 0.53 | ○ | 0.55 | ○ | 0.81 | ○ |
| 3 | 0.48 | ○ | 0.42 | x | 0.44 | x | 0.45 | x | 0.77 | ○ |
| 4 | 0.39 | ○ | 0.35 | x | 0.35 | x | 0.38 | x | 0.67 | ○ |
| 5 | 0.26 | ○ | 0.15 | x | 0.21 | x | 0.29 | x | 0.61 | ○ |
| 6 | 0.25 | ○ | 0.14 | x | 0.17 | x | 0.19 | x | 0.54 | ○ |
| 7 | 0.18 | ○ | 0.09 | x | 0.06 | x | 0.02 | x | 0.47 | ○ |

TABLE 3

| | Thickness (μm) 20 Modulus | | | | | | | | | |
|---|---|---|---|---|---|---|---|---|---|---|
| Radius of | 0.1 | | 0.2 | | 1 | | 2 | | 2.2 | |
| curvature (R) | Bending stress | Crack occurrence | Bending stress | Crack occurrence | Bending stress | Crack occurrence | Bending stress | Crack occur-rence | Bending stress | Crack occurrence |
| 1 | 0.48 | ○ | 0.41 | ○ | 0.43 | ○ | 0.44 | ○ | 0.62 | ○ |
| 2 | 0.33 | ○ | 0.31 | ○ | 0.33 | ○ | 0.35 | ○ | 0.57 | ○ |
| 3 | 0.27 | ○ | 0.11 | x | 0.11 | x | 0.12 | x | 0.35 | ○ |
| 4 | 0.18 | ○ | 0.09 | x | 0.09 | x | 0.11 | x | 0.28 | ○ |
| 5 | 0.16 | ○ | 0.07 | x | 0.07 | x | 0.09 | x | 0.17 | ○ |
| 6 | 0.12 | ○ | 0.06 | x | 0.06 | x | 0.05 | x | 0.15 | ○ |
| 7 | 0.09 | ○ | 0.04 | x | 0.03 | x | 0.04 | x | 0.11 | ○ |

TABLE 4

| | Thickness (μm) 30 Modulus | | | | | | | | | |
|---|---|---|---|---|---|---|---|---|---|---|
| Radius of | 0.1 | | 0.2 | | 1 | | 2 | | 2.2 | |
| curvature (R) | Bending stress | Crack occurrence | Bending stress | Crack occurrence | Bending stress | Crack occurrence | Bending stress | Crack occurrence | Bending stress | Crack occurrence |
| 1 | 0.32 | ○ | 0.31 | ○ | 0.34 | ○ | 0.35 | ○ | 0.57 | ○ |
| 2 | 0.28 | ○ | 0.17 | ○ | 0.18 | ○ | 0.18 | ○ | 0.34 | ○ |
| 3 | 0.18 | ○ | 0.12 | x | 0.14 | x | 0.15 | x | 0.31 | ○ |
| 4 | 0.14 | ○ | 0.09 | x | 0.08 | x | 0.08 | x | 0.23 | ○ |
| 5 | 0.11 | ○ | 0.05 | x | 0.06 | x | 0.07 | x | 0.18 | ○ |
| 6 | 0.10 | ○ | 0.04 | x | 0.05 | x | 0.06 | x | 0.15 | ○ |
| 7 | 0.09 | ○ | 0.03 | x | 0.04 | x | 0.05 | x | 0.14 | ○ |

TABLE 5

| | Thickness (μm) 40 Modulus | | | | | | | | | |
|---|---|---|---|---|---|---|---|---|---|---|
| Radius of | 0.1 | | 0.2 | | 1 | | 2 | | 2.2 | |
| curvature (R) | Bending stress | Crack occurrence | Bending stress | Crack occurrence | Bending stress | Crack occurrence | Bending stress | Crack occurrence | Bending stress | Crack occurrence |
| 1 | 0.84 | ○ | 0.76 | ○ | 0.82 | ○ | 0.91 | ○ | 1.05 | ○ |
| 2 | 0.76 | ○ | 0.62 | ○ | 0.76 | ○ | 0.84 | ○ | 0.89 | ○ |
| 3 | 0.59 | ○ | 0.53 | ○ | 0.61 | ○ | 0.66 | ○ | 0.77 | ○ |
| 4 | 0.48 | ○ | 0.41 | ○ | 0.59 | ○ | 0.63 | ○ | 0.71 | ○ |
| 5 | 0.41 | ○ | 0.39 | ○ | 0.51 | ○ | 0.59 | ○ | 0.58 | ○ |

TABLE 5-continued

| | Thickness (μm) 40 Modulus | | | | | | | | | |
|---|---|---|---|---|---|---|---|---|---|---|
| Radius of | 0.1 | | 0.2 | | 1 | | 2 | | 2.2 | |
| curvature (R) | Bending stress | Crack occurrence | Bending stress | Crack occurrence | Bending stress | Crack occurrence | Bending stress | Crack occurrence | Bending stress | Crack occurrence |
| 6 | 0.39 | ○ | 0.34 | ○ | 0.40 | ○ | 0.42 | ○ | 0.51 | ○ |
| 7 | 0.25 | ○ | 0.28 | ○ | 0.34 | ○ | 0.41 | ○ | 0.38 | ○ |

As shown in Tables 1 to 5 above, when the first and second adhesive layers 220 and 240 have a modulus of 0.2 to 2 and a thickness of 10 to 30 μm, cracks did not occur in the electrode layer 230 up to a radius of curvature of 3R.

Accordingly, in the touch sensor panel of the present invention shown in FIG. 2, it may be desirable to limit the modulus of the first and second adhesive layers 220 and 240 to 0.2 to 2 and the thickness thereof to 10 to 30 μm.

The preferred embodiments of the present invention have been described with reference to the drawings. However, the present invention is not limited to the above-described embodiments, it will be understood that the present invention can be implemented in a modified form without departing from the essential characteristics of the present invention. The above-described embodiments of the present invention can be applied independently or in combination with some or all of its features.

Therefore, the scope of the present invention is defined by the claims rather than the foregoing description, and all differences within the equivalent range should be interpreted as being included in the present invention.

DESCRIPTION OF REFERENCE NUMERALS

| | |
|---|---|
| 110: COP layer | 120: UV adhesive layer |
| 130: electrode layer | 140: PSA layer |
| 150: polarization layer | 210: base layer |
| 220: first adhesive layer | 230: electrode layer |
| 240: second adhesive layer | 250: functional layer |

The invention claimed is:

1. A touch sensor panel comprising:
a base layer comprising a first side and a second side, wherein the base layer is a cyclo-olefin polymer (COP) layer;
a first adhesive layer having a first side and a second side, wherein one of the first and the second sides of the first adhesive layer is bonded to one of the first and the second sides of the base layer and wherein the first adhesive layer is composed of a pressure-sensitive adhesive (PSA);
an electrode layer having a first side and a second side, wherein one of the first and the second sides of the electrode layer is bonded to the other of the first and the second sides of the first adhesive layer;
a second adhesive layer having a first side and a second side, wherein one of the first and the second sides of the second adhesive layer is bonded to the other of the first and the second sides of the electrode layer and wherein the second adhesive layer is composed of a pressure-sensitive adhesive (PSA); and
a functional layer having a first side and a second side, wherein one of the first and the second sides of the functional layer is bonded to the other of the first and the second sides of the second adhesive layer, wherein the functional layer is a polarization layer,
wherein the first and the second adhesive layers have a modulus of 1 to 2 MPa and a thickness of 20 to 30 μm, thereby minimizing the occurrence of cracks in the electrode layer while maximizing the dynamic folding capability of the touch sensor panel.

* * * * *